United States Patent [19]
Howard

[11] Patent Number: 5,345,660
[45] Date of Patent: Sep. 13, 1994

[54] METHOD OF MANUFACTURING A MAGAZINE OF PREDETERMINED NUMBER OF CARTRIDGES

[76] Inventor: William J. Howard, P.O. Box 573, Wilson, N.C. 27893

[21] Appl. No.: 28,147

[22] Filed: Mar. 9, 1993

[51] Int. Cl.$^5$ .............. B21K 21/04; B23P 15/22; F41A 9/62; B29C 45/36
[52] U.S. Cl. ...................... 29/1.3; 29/401.1; 29/DIG. 29; 42/50
[58] Field of Search .......... 29/1.3, 1.31, 1.32, 29/DIG. 29, 401.1, 903, 527.4; 42/50; 164/340; 249/102, 142, 175, 177; 425/190, 192, 193, 577

[56] References Cited

U.S. PATENT DOCUMENTS

| | | | |
|---|---|---|---|
| 3,087,270 | 4/1963 | Stoner | 42/50 |
| 3,906,652 | 9/1975 | Evans | 42/50 |
| 4,139,959 | 2/1979 | Howard et al. | 42/50 |
| 4,205,474 | 6/1980 | Musgrave | 42/50 |
| 4,303,221 | 12/1981 | Gallusser et al. | 249/142 X |
| 4,684,101 | 8/1987 | Wagner et al. | 164/340 X |
| 4,738,202 | 4/1988 | Hebert | 29/1.31 X |
| 4,888,900 | 12/1989 | Howard | 42/50 |
| 4,959,007 | 9/1990 | Okuyama | 425/577 |
| 5,113,604 | 5/1992 | Vyprachticky | 42/50 |
| 5,149,897 | 9/1992 | Howard | 42/50 |

FOREIGN PATENT DOCUMENTS

| | | | |
|---|---|---|---|
| 248772 | 12/1987 | European Pat. Off. | 42/50 |
| 708187 | 7/1941 | Fed. Rep. of Germany | 42/50 |

OTHER PUBLICATIONS

"Magazines For Colt Automatic Pistols" The American Rifleman, Aug. 1977, page 70.

Primary Examiner—Peter Dungba Vo
Attorney, Agent, or Firm—David R. Murphy

[57] ABSTRACT

A process for making these magazines includes the steps of providing mold halves forming a cavity with an insert-receiving core, and a number of inserts each having a projection-producing depression a distance from the top of the magazine equal to that occupied by the given number of cartridges. After selecting an insert it is secured to the core; the mold halves are mated; and a melted hot plastic composition is injected into the cavity to form a hot casting of the shell of the magazine. The mold is opened, the hot casting removed and cooled to form a shell which is then assembled.

5 Claims, 4 Drawing Sheets

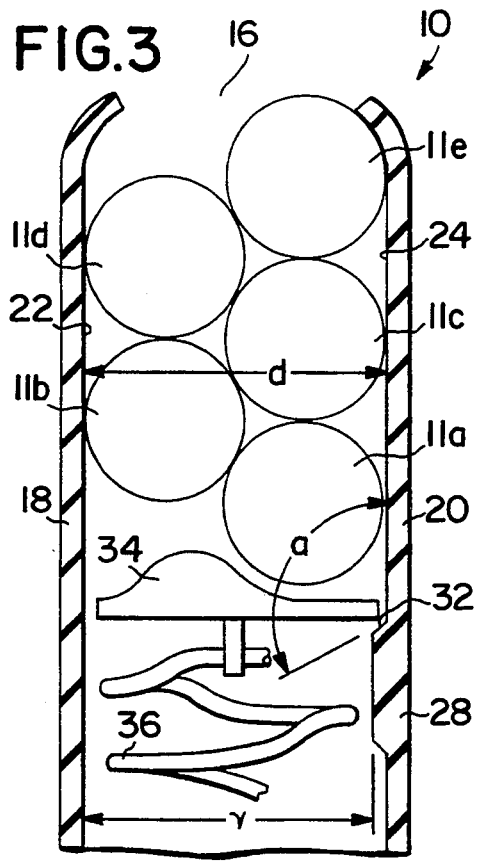
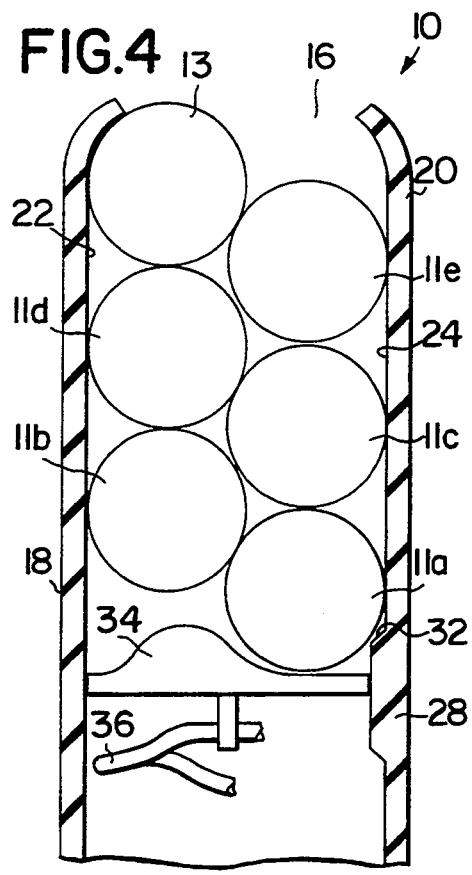
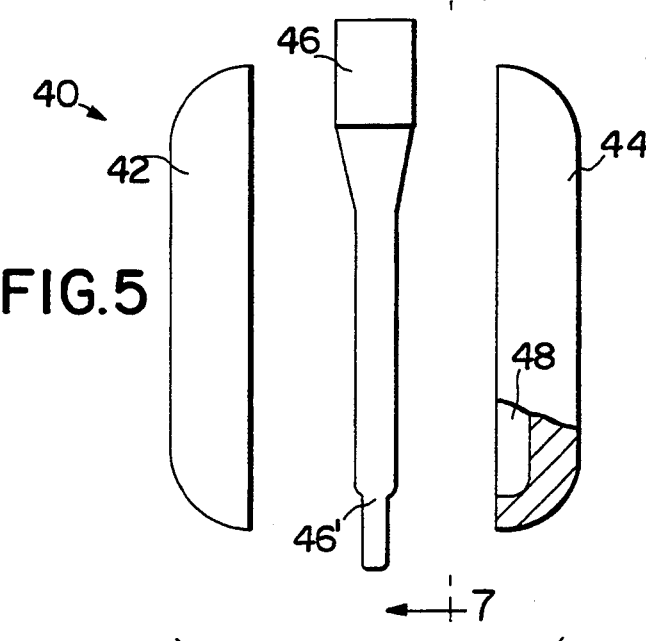
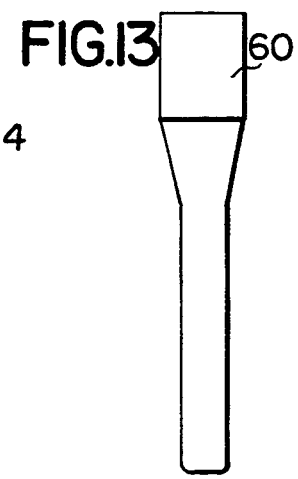

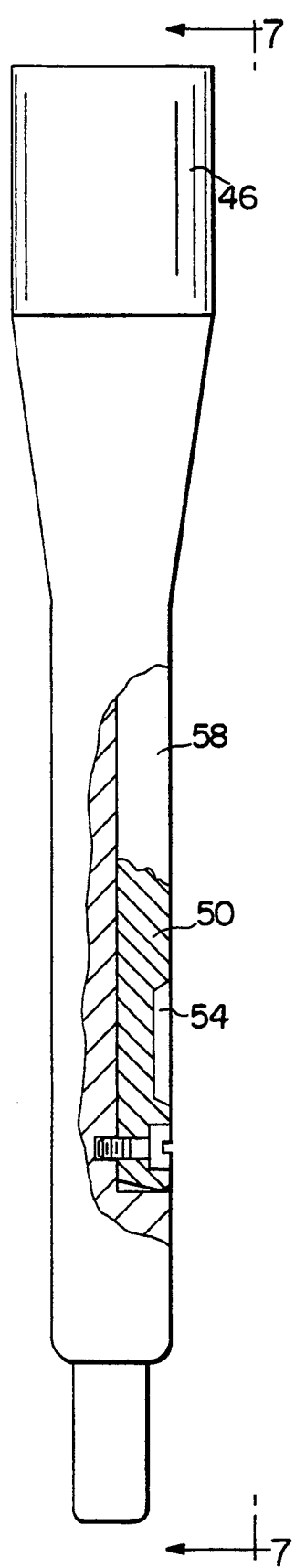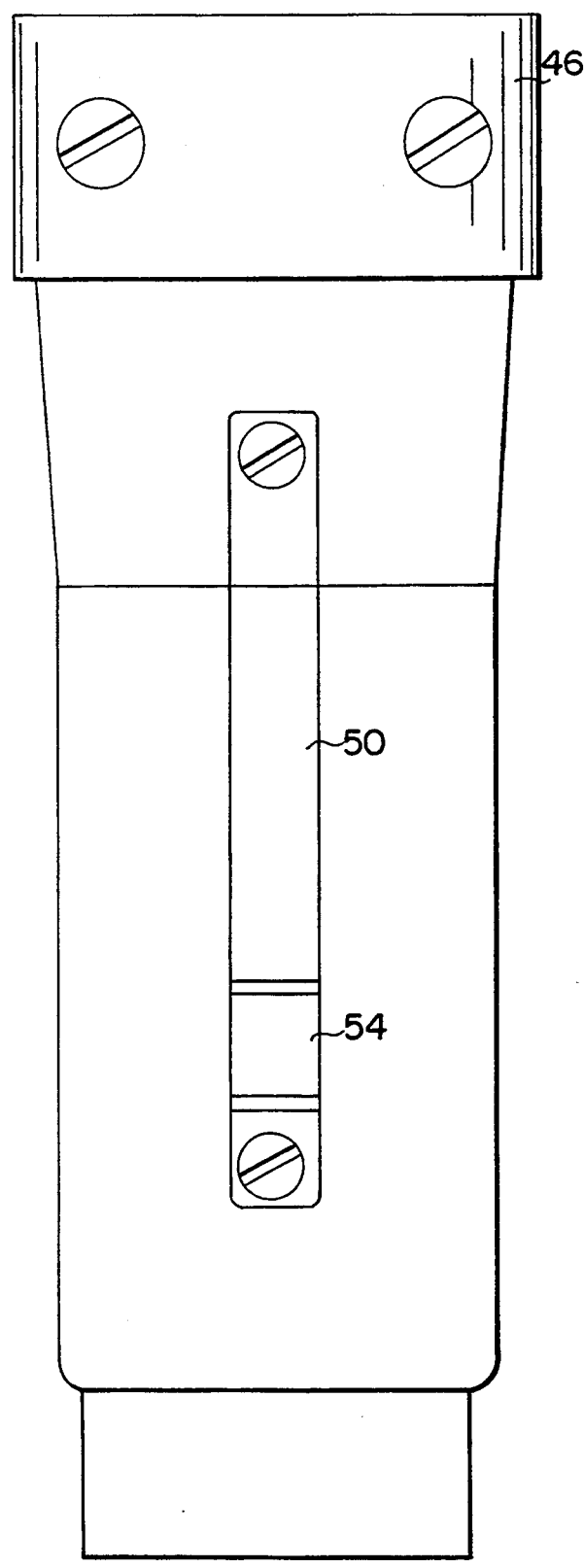

METHOD OF MANUFACTURING A MAGAZINE OF PREDETERMINED NUMBER OF CARTRIDGES

In the United States of America and in other countries, there have been recently a number of instances when deranged persons and/or criminals have used semi-automatic or automatic firearms to take hostages and to perpetuate acts of mass violence. Magazines holding twenty, thirty and forty are readily available for these firearms. Twenty round magazines are very common.

In an effort to minimize the damaging effects of the use during these acts, of automatic and semi automatic firearms, a number of jurisdictions have passed or are considering passing, laws restricting the number of rounds that can be held by a magazine. Canada has a ceiling of five rounds. New Jersey has a ceiling of seven. California is contemplating a ceiling of ten. Some pending United States federal legislation sets the number at fifteen. Other jurisdictions may set ceilings of different numbers. Those jurisdictions which have set ceilings may change them at any time.

It is important that there be full compliance with both the letter and the spirit of the laws of each and every jurisdiction. To this end it should not be possible to readily modify a magazine to unlawfully increase the number of rounds that it can hold. It would be highly desirable if a magazine would simply cease to function if it held more that the lawfully prescribed number of rounds. No such magazine exists.

I has been suggested that to produce a magazine holding a fewer number of cartridges that it is only necessary to shorten the magazine. This suggestion is unacceptable for a number of reasons. First, a magazine holding only five rounds would be so short that it might no project from the firearm. Even if it did project it would not be big enough to grasp for easy removal. Second, sportsmen and others frequently grip the magazine while firing.

It is possible for manufacturers to have completely different molds for each jurisdiction which specifies a different maximum number of rounds. This is however very expensive. Furthermore the additional set up time for manufacturing adds to the manufacturing costs.

Accordingly it is an object of the present invention to provide an improved magazine and method for making it which is substantially free of the problems associated with prior magazines.

An additional object is to provide an improved magazine which resists receiving a number of cartridges in excess of a predetermined number.

Another object is to provide an improved magazine which will not feed any cartridges to a firearm if the magazine contains more that a specified number.

Yet another object is to provide a process for making an improved magazine which process utilizes the same molds heretofore used.

Still an additional object is to provide an improved process for making the magazines of the present invention which process can produce magazines having a different maximum number of cartridges in compliance with the laws of different jurisdictions, quickly and without expensive mold changes.

BRIEF DESCRIPTION OF THE DRAWINGS

Additional objects and advantages of the present invention will be apparent to those skilled in the art by reference to the following description and drawings wherein:

FIG. 3 is an enlarged schematic sectional view taken along Line 3—3 of FIG. 1, showing a magazine of the present invention designed to hold a maximum of only five cartridges; and FIG. 4 is an enlarged schematic sectional view also taken along Line 3—3 of FIG. 1, but showing how the magazine of the present invention will not feed cartridges if it contains six rounds; and FIG. 5 is a schematic representation, on a greatly reduced scale, showing a portion of an apparatus, including two mold halves and a core, useful in the practice of the process of the present invention; and FIG. 6 is a full scale, partially cut away view of the core of FIG. 5; and FIG. 7 is a side view of the core of FIG. 5 taken along line 7—7 of FIG. 6 which is also along Line 7—7 of FIG. 5; FIG. 13 shows a mandrel useful in the process of the present invention.

DETAILED DESCRIPTION OF THE DRAWINGS

Figure 1:
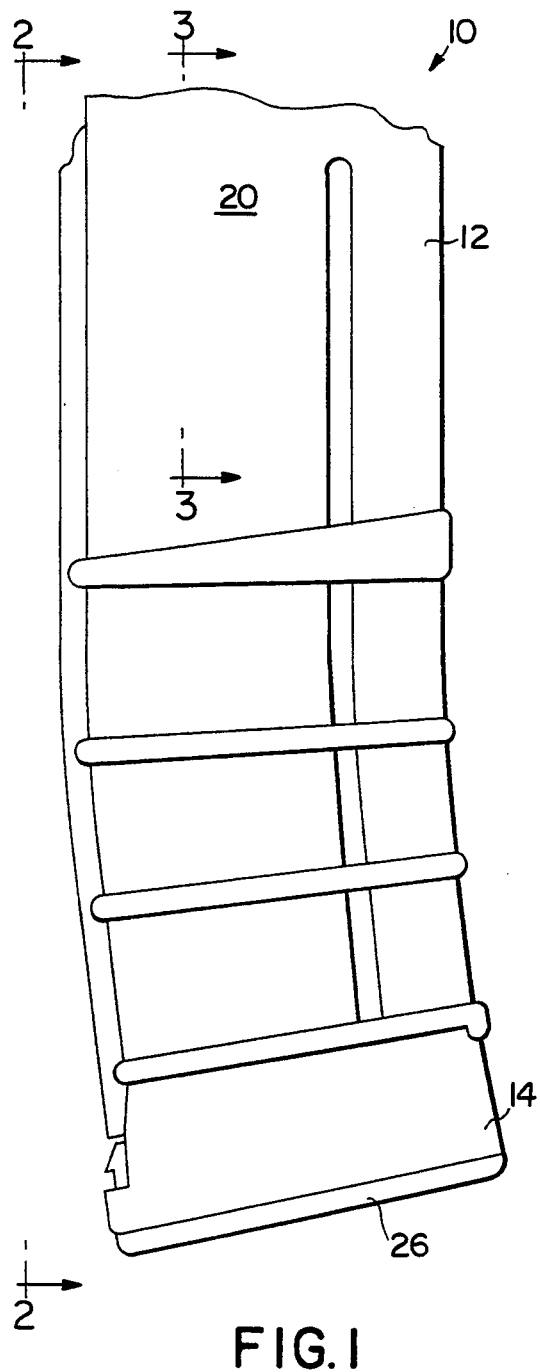
FIG. 1 is a full scale side view of a magazine of the present invention.
Figure 2:
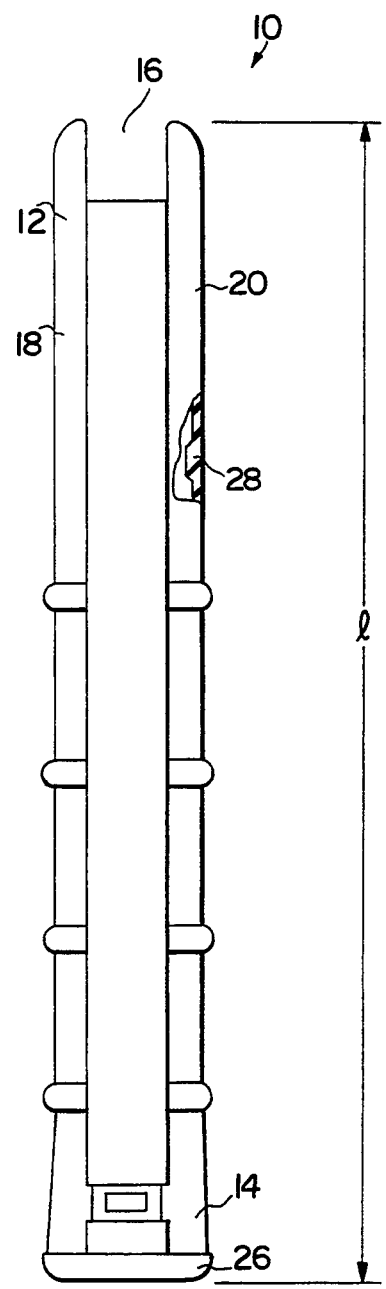
FIG. 2 is an end view taken along Line 2—2 of FIG. 1.

According to one aspect of the present invention there is provided a magazine for holding a specific, predetermined number of cartridges which number is fewer than about sixteen; and for reliably feeding these cartridges to the chamber of a bolt-equipped firearm. The magazine has the external appearance of a standard magazine holding at least about twenty rounds. The magazine comprises a shell, a follower, a base plate, a spring and a projection.

The shell has a closable bottom; an open top; and juxtaposed side walls. The internal surfaces of the juxtaposed side walls are substantially parallel and are spaced from each other by a given distance. At least one of the side walls carries a projection. The distance from the projection to the next adjacent internal surface is less than the given distance thereby defining a reduced distance.

The follower is within the shell. The width of the follower is less than the given distance between the internal surfaces of the juxtaposed side walls but is greater than the reduced distance from the projection to the next adjacent internal surface.

The base plate is removably attached to the bottom of the shell. The spring is compressed against the base plate and biases the follower toward the open top.

The projection functions to inhibit downward movement of the follower thereby inhibiting the feeding to the magazine of any cartridge after the magazine contains the predetermined number of cartridges. The projection also prevents feeding of any cartridge from the magazine to the chamber of the firearm if the magazine contains a quantity of cartridges greater than the predetermined number.

According to another aspect of the present invention there is provided a process for producing the above-described magazine. The process comprises the following described steps.

Initially first and second mold halves and a core with a number of inserts are provided at hand. The first and second mold halves, when mated, form a cavity, the inside surfaces of which correspond to the outside surfaces of the shell.

The core is adapted to fit within the cavity. It has a recess adapted to receive any one of a number of inserts. The outside surface of the core corresponds to the inside surface of the shell.

Each insert has a projection-producing depression a distance from the open top of the magazine a distance equal to that occupied by the given number of cartridges. The insert is adapted to fit into the recess.

Next an insert is selected from among those provided. That insert is secured in the recess in the core. The first mold half is then mated to the second mold half. The mold cavity is injected with a melted organic thermoplastic molding composition thereby forming a hot casting. The hot casting, while still on the core, is then cooled to a temperature at which the hot casting is resiliently flexible.

The mold is opened by separating the first mold half from the second half still leaving the hot casting attached to the core. The hot casting is then stripped from the core and cooled to room temperature whereupon the hot casting becomes a magazine shell.

The magazine is then assembled by inserting into the shell the follower above the projection, then the spring below the follower. A removable base plate is then attached to hold the spring in place. The cartridge can then be loaded with the predetermined number of cartridges.

Referring now to the drawings in general and in particular to FIGS. 1 through 4 there is shown a magazine 10 for holding five and only five cartridges 11a, 11b, 11c, 11d, 11e. The magazine 10 reliably feeds these cartridges 11a, 11b, 11c, 11d, 11e, to the chamber (not shown) of a bolt-equipped firearm (not shown). The magazine 10 has a length "l" equal to that of a twenty-round magazine.

The magazine 10 comprising a shell 12 comprising a closable bottom 14; an open top 16; and a pair of juxtaposed side walls 18, 20. The internal surfaces 22, 24 of the side walls 18, 20 are substantially parallel and spaced from each other by a given distance "d". The side wall 20 carries a projection 28 such that the distance from the projection 28 to the internal surface of the next adjacent side wall 18 is less than the given distance "d" between the side walls 18, 20 thereby defining a reduced distance "r". The upper surface of the projection 28 forms a ramp 32 at an obtuse angle "a" of about 135° with respect to the inner surface 24 of the wall 20 which is carrying the projection 28.

The magazine 10 further comprises a follower 34 within the shell 12. The width of the follower 34 is less than the given distance "d" but is greater than the reduced distance "r".

The magazine 10 further comprises a base plate 26 removably attached to the bottom 14; and a spring 36 compressed against the base plate 26 and biasing the follower 34 toward the open top 16.

By virtue of the projection 28 and the other structural features described herein loading cartridges 11a, 11b, 11c, 11d, 11e, in the magazine 10 through the open top 16 compresses the spring 36 and moves the follower 34 toward the ramp 32 until the magazine 10 has received the five cartridges 11a, 11b, 11c, 11d, 11e, whereupon the follower 34 contacts the ramp 32 thereby resisting reception of any additional cartridges as clearly shown in FIG. 3. If a sixth cartridge 13 is pushed into the magazine 10, resistance occurs with a force greater than the force applied by the spring 36 alone.

As shown in FIG. 4, forcing the sixth cartridge 13 through the open top 16 and against the follower 34 through the five cartridges 11a, 11b, 11c, 11d, 11e, creates further pressure on the follower 34 causing the follower 34 to ride down the ramp 32, forcing the side walls 18, 20 outwardly away from each other. This causes jamming of the follower 34 between the projection 28 and the opposite side wall 18 with a lateral force so great that the upward force of the spring 36 is insufficient to cause upward movement of the follower 34. This prevents feeding of any of the six cartridges 11a, 11b, 11c, 11d, 11e, 13 to the firearm (not shown).

Referring now to FIG. 5 there is shown an apparatus 40 especially useful for practicing the improved process for making the magazine 10. The apparatus 40 produces the magazine 10 upside down i.e. with the open top 16 produced at the teat 16'. The apparatus 40 comprises a first mold half 42, a second mold half 44, a core 46 and a number of inserts such as the inserts 50, 51, 52, 53 (See FIGS. 8-12). The mold halves 42, 44 are mated by moving the left mold half 42 to the right until it contacts the core 46 and by moving the right mold half 44 to the left until it also contacts the core 46. When so mated, a cavity 48 is formed the inside surfaces of which correspond to the outside surfaces of the shell 12. The core 46 fits within the cavity 48 leaving an annular space between the core 46 and the inside surfaces of the mold halves 42, 44.

Referring now to FIGS. 6 and 7 it can be seen than the core 46 has a insert-receiving recess 58 adapted to receive any of a plurality of inserts 50, 51, 52, 53 (See FIGS. 8-12) wherein the outside surface of the core 46 corresponds to the inside surface of the shell 12.

Figure 8:
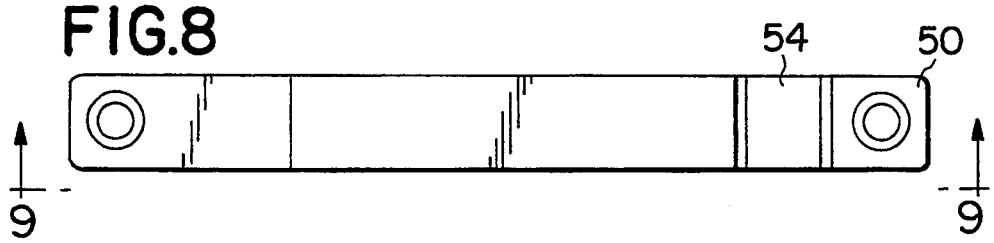
FIG. 8 is a full scale top view of an insert useful to produce a magazine of the present invention holding a maximum of five rounds produced according to the process of the present invention.
Figure 9:
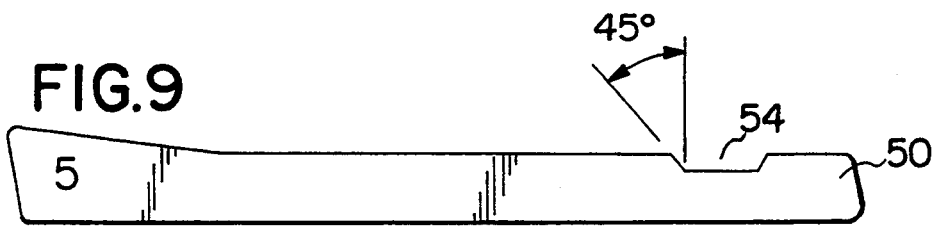
FIG. 9 is a side view of the insert of FIG. 8 taken along line 9—9 of FIG. 8.

As shown in FIGS. 8 and 9 it can be seen that the five cartridge insert 50 has a projection-producing depression 54 a distance from the open top 16 of the magazine 10 equal to that occupied by the five cartridges 11a, 11b, 11c, 11d, 11e. The insert 50 is adapted to fit into the insert-receiving recess 58 in the core 46.

Figure 10:
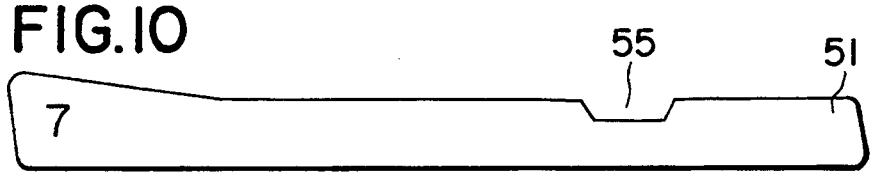
FIG. 10 is a side view of an insert similar to that of FIG. 9 but which insert produces a magazine capable of holding a maximum of seven rounds.

As shown in FIG. 10 the seven cartridge insert 51 has a projection-producing depression 55 a distance from the open top 16 of the magazine 10 equal to that occupied by seven cartridges. The insert 51 is adapted to fit into the insert-receiving recess 58 in the core 46.

Figure 11:
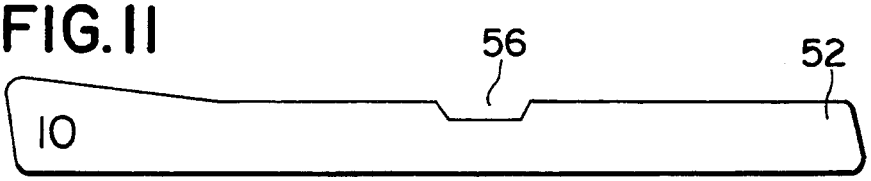
FIG. 11 is a side view of an insert similar to that of FIG. 9 but which insert produces a magazine capable of holding a maximum of ten rounds.

As shown in FIG. 11 the ten cartridge insert 56 has a projection-producing depression 56 a distance from the open top 16 of the magazine 10 a distance equal to that occupied by ten cartridges. The insert 52 is adapted to fit into the insert-receiving recess 58 in the core 46.

Figure 12:
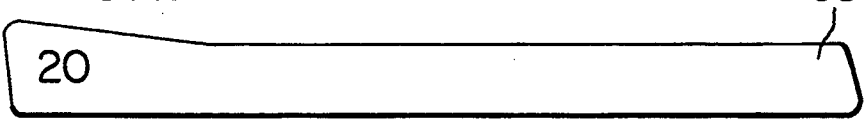
FIG. 12 is a side view of an insert similar to that of FIG. 9 but which insert produces a prior art magazine capable of holding twenty rounds.

As shown in FIG. 12 the apparatus 40 also has an insert 53 which also fits into the insert-receiving recess 58. The insert 53 contains no depression. When the insert 53 is placed in the core 46, the resultant magazine is not a magazine 10 of the present invention but rather is a prior art magazine having no projection and thus not having the advantages of the present invention. On the other hand provision of the depression-free insert 53 is necessary so that the same mold halves 42, 44, and the same core 46 can be used to also produce the standard, prior art, unrestricted, twenty-round magazine.

FIG. 13 shows a mandrel 60 useful for supporting the hot casting. The mandrel 60 has an external shape substantially identical to the core 46 except that the mandrel 60 can be slightly smaller and has no insert and no projection-forming recess.

The process of the present invention for producing the magazine 10 of the present invention is a multi-step process. This process comprises the following steps.

I. The above-described mold halves 42, 44, core 46 and inserts 50, 51, 52, 53 are first provided close at hand.

II. A single insert is then selected from among the inserts 50, 51, 52.

III. The selected insert is secured in the insert-receiving recess 58 in the core 46.

IV. The first mold half 42 is mated to the second mold half 44 forming the cavity 48 with the core 46 within the cavity 48.

V. A hot melt of melted organic thermoplastic molding composition is injected into the cavity 48 thereby forming a hot casting.

VI. The hot casting is cooled to a temperature of about 200° to about 250° F. at which temperature the hot casting is resiliently flexible.

VII. The mold is opened by separating the first mold half 42 from the second half 44 and by removing both halves 42, 44 from contact with the hot casting. This leaves the hot casting attached to the core 46.

VIII. The hot casting is stripped from the core 46 while the hot casting is maintained at a temperature of about 150° to about 300° F.

IX. The hot casting is placed on a supporting mandrel 60.

X. The hot casting, while still on the mandrel 60, is cooled to a temperature of about 100° to about 150° F. At this temperature the hot casting is dimensionally stable and is self-supporting.

XI. The hot casting is then cooled to room temperature of about 68° F. whereupon the hot casting becomes a shell 12 for the magazine 10.

XII. The follower 34 is inserted into the shell 12 above the projection 28.

XIII. A spring 36, which upwardly biases the follower 34, is inserted into the shell 12 below the follower 34.

XIV. The removable base plate 26 is attached to hold the spring 36 in place thus completing assembly of the magazine 10. The magazine 10 can now be loaded with cartridges.

The process is preferably practiced in the same sequence as the steps given above, but can also be practiced with the steps in a different sequence.

By selection of an appropriate insert, the magazine 10 of the present invention can be designed to hold five, seven, ten fifteen or in fact any maximum number of rounds so long as an insert is provided which will mold the projection at a distance from the open top 16 corresponding to the predetermined number of rounds.

The magazine 10 of the present invention in preferably formed entirely of an organic thermoplastic composition. Potentially suitable thermoplastics include among others polyethylene, polypropylene, polycarbonate and nylon. The preferred organic thermoplastic is nylon. Nylon does not break as easily as does polycarbonate. Nylon is more resistant to chemicals than is polycarbonate. Nylon has a melting point that is higher than either polyethylene of polypropylene.

A wide variety of nylons can be used such as nylon 4, nylon 6, nylon 66, nylon 610, nylon 7, nylon 8, nylon 9, nylon 11 and nylon 6-12 which is preferred.

The organic thermoplastic can be use alone but is preferably used with fibers such as mineral fibers, carbon fibers and glass fibers which are preferred. It is common and desirable to include an amount of carbon black sufficient to make the composition opaque.

Dyes and fillers are generally unnecessary but can be added so long as they do not materially adversely affect any important property.

The best organic thermoplastic composition presently known comprises: from about 0.1 to about 5 weight percent carbon black; from about 15 to about 70 weight percent glass fibers; balance essentially nylon 6-12; wherein all percentages are based on the entire weight of the composition. A composition of 0.25 weight percent carbon black, 43 weight percent glass fibers, balance nylon 6-12 is currently employed. This product is currently sold by the Dupont Chemical Company of Wilmington, Del., U.S.A. under the trade name "77G42".

The temperature of the melted thermoplastic composition is chosen to be high enough to give sufficient flow while not being so high as to cause thermal degradation of the organic plastic or other components of the composition. The melted composition is generally maintained at a temperature of about 525° to about 600° F. and preferably at about 550° to about 575° F. These temperatures are employed when using the above-described composition of carbon black, glass fibers and nylon 6-12. Those skilled in the art employing different compositions can readily determine optimum operating temperature at which to inject the melted composition without undue experimentation.

The temperature at which the hot casting is stripped from the core 46 is lower than the temperature of the melt, but is higher than room temperature (68° F.). The hot casting must be at a sufficiently high temperature such that it can deform slightly permitting the projection 28 to ride out of the depression 54, 55, 56 without cracking the walls 18, 20. The hot casting is generally maintained at a temperature of from about 150° to about 300° F. and is preferably maintained at a temperature of about 200° to about 250° F. When using the above-described composition of carbon black, glass fibers and nylon 6-12 these temperatures are suitable. Those skilled in the art employing different compositions can readily determine the optimum temperature for stripping without undue experimentation.

Although the invention has been described in considerable detail with reference to a preferred embodiment thereof, it will be understood that changes and modifications can be made without departing from the scope of the invention as described above and as defined in the appended claims.

What is claimed is:

1. A process for making a magazine for holding a specific, predetermined number of cartridges which number is fewer than about sixteen; and for reliably feeding these cartridges to the chamber of a bolt-equipped firearm; said magazine having the external appearance of a standard magazine holding at least about twenty rounds; said magazine comprising:

A. a shell comprising a closable bottom; an open top; and juxtaposed side walls, wherein the internal surfaces of the juxtaposed side walls are substantially parallel and spaced from each other by a given distance; one of said side walls carrying a projection such that the distance from the projection to the next adjacent internal surface is less than the given distance thereby defining a reduced distance; and B. a follower within the shell; wherein the width of the follower is less than the given distance between the internal surfaces of the juxtaposed side walls but is greater than the reduced distance from the projection to the next adjacent internal surface; and C. a base plate removably attached to the bottom of the shell; and D. a spring compressed against the base plate and biasing the follower toward the open top; and E. projection means for inhibiting downward movement of the follower thereby inhibiting the feeding to the magazine of any cartridge after the magazine contains said predetermined number of cartridges; and F. means for preventing feeding of any cartridge from the magazine to the chamber of the firearm if the magazine contains a quantity of cartridges greater than the predetermined number; and said process comprising the steps of:

I. providing:
   A. first and second mating mold halves which when mated form a cavity, the inside surfaces of which correspond to the outside surfaces of the shell; and
   B. a core adapted to fit within the cavity and having a recess adapted to receive any one of a plurality of inserts wherein the outside surface of the core corresponds to the inside surface of the shell; and
   C. a plurality of inserts having a projection-producing depression a distance from the open top of the magazine equal to that occupied by the given number of cartridges: each of said inserts adapted to fit into the insert-receiving recess; and II. selecting an insert from among those provided; and III. securing that insert in the recess in the core; and IV. mating the first mold half to the second mold half; and V. injecting a melted organic thermoplastic molding composition into the cavity thereby forming a hot casting; and VI. cooling the hot casting to a temperature at which the hot casting is resiliently flexible; and VII. opening the mold by separating the first half from the second half leaving the hot casting attached to the core; and VIII. stripping the hot casting from the core; and then IX. cooling the hot casing to room temperature whereupon the hot casting becomes a magazine shell; and X. inserting into the magazine shell, the follower above the projection formed by the insert; and XI. inserting into the shell below the follower a spring which upwardly biases the follower; and XII. attaching a removable base plate to hold the spring in place; and thereby producing the magazine.

2. The process of claim 1 wherein the melted organic thermoplastic molding composition comprises carbon black, glass fibers, and nylon.

3. The process of claim 2 wherein the injecting in Step V of the melted thermoplastic molding composition is practiced while maintaining the composition at a temperature of about 525° to about 600° F.

4. The process of claim 2 wherein the cooling of Step VI is practiced at a temperature of about 150° to about 300° F.

5. A process for making a magazine for holding a specific, predetermined number of cartridges which number is five, seven, or ten; and for reliably feeding these cartridges to the chamber of a bolt-equipped firearm; said magazine having the external appearance of a standard magazine holding at least about twenty rounds; said magazine comprising:

A. a shell comprising a closable bottom; an open top; and juxtaposed side walls, wherein the internal surfaces of the juxtaposed side walls are substantially parallel and spaced from each other by a given distance; one of said side walls carrying a projection such that the distance from the projection to the next adjacent internal surface is less than the given distance thereby defining a reduced distance; wherein the projection has an upper surface forming a ramp at an obtuse angle of about 135° with respect to the inner surface of the wall which is carrying the projection; and B. a follower within the shell; wherein the width of the follower is less than the given distance between the internal surfaces of the juxtaposed side walls but is greater than the reduced distance from the projection to the next adjacent internal surface; and C. a base plate removably attached to the bottom of the shell; and D. a spring compressed against the base plate and biasing the follower toward the open top; and said process comprising, in sequence, the steps of:

I. providing:
   A. first and second mold halves which when mated form a cavity the inside surfaces of which correspond to the outside surfaces of the shell; and
   B. a core adapted to fit within the cavity leaving an annular space between the core and the inside surfaces of the mold halves; said core having a insert-receiving recess adapted to receive any of a plurality of inserts wherein the outside surface of the core corresponds to the inside surface of the shell; and
   C. a five cartridge insert having a projection-producing depression a distance from the open top of the magazine a distance equal to that occupied by five cartridges from the top adapted to fit into the insert-receiving recess; and D. a seven cartridge insert having a projection-producing depression a distance from the open top of the magazine a distance equal to that occupied by seven cartridges from the top adapted to fit into the insert-receiving recess; and E. a ten cartridge insert having a projection-producing depression a distance from the open top of the magazine a distance equal to that occupied by ten cartridges from the top adapted to fit into the insert-receiving recess; and II. selecting a single insert from among those provided; and then III. securing the selected insert in the insert-receiving recess in the core; and then IV. mating the first mold half to the second mold half; and then V. injecting, at 550° to 575° F., a melted organic thermoplastic molding composition of 0.1 to 5 weight percent carbon black; 15 to 70 weight percent glass fibers; balance essentially nylon 6-12; wherein all percentages are based on the weight of the entire composition; into the cavity thereby forming a hot casting; and then VI. cooling the hot casting to a temperature of 200° to 250° F. at which temperature the hot casting is resiliently flexible; and then VII. opening the mold by separating the first half from the second half and by removing both halves from contact with the hot casting, thereby leaving the hot casting attached to the core; and then VIII. stripping the hot casting from the core while the hot casting is maintained at a temperature of 200° to 250° F.; and then IX. placing the hot casting on a supporting mandrel; and then X. cooling the hot casing while still on the mandrel to a temperature of about 100° to about 150° F., at which temperature the hot casing is dimensionally stable and is self-supporting; and then XI. cooling the hot casting to room temperature whereupon the hot casting becomes a magazine shell; and then XII. inserting into the magazine shell a follower above the projection formed by the insert; and then XIII. inserting into the shell below the follower a spring which upwardly biases the follower; and then XIV. attaching a removable base plate to hold the spring in place; and thereby producing the magazine.

* * * * *